UNITED STATES PATENT OFFICE 2,319,395

AQUEOUS DRILLING MUD

Hugh S. Ten Eyck and Chester A. Fulton, Baltimore, Md., assignors to Southern Phosphate Corporation, Baltimore, Md., a corporation of Delaware No Drawing. Application June 17, 1941,
Serial No. 398,407

11 Claims. (Cl. 252—8.5)

This invention is concerned with an aqueous drilling mud containing finely divided water-insoluble mineral phosphates and the method of drilling a mud with this drilling mud.

Drilling muds employed in rotary drilling operations are generally circulated through the bore hole by being pumped down the drill stem to the drill bit, returning to the surface of the hole in the space around the stem. The drilling mud thus employed should serve to lubricate and cool the drill bit and stem, to carry out of the hole rock cuttings produced by the bit, to plaster the sides of the hole so as to form a relatively impervious sheath to resist filtration of water, etc. into the hole and to prevent escape of drilling fluid out of the hole into the penetrated formations, and to provide hydrostatic head to prevent escape of gas or oil from high pressure formations penetrated during drilling.

It has been proposed heretofore to employ clays with various addition agents, both organic and inorganic, as ingredients in the formation of drilling muds, but many of these clay preparations are too expensive for use in a drilling campaign in which several hundred tons of solids may be consumed in a single well, and many of the clay preparations proposed heretofore are not such that they form a drilling mud which will perform all of the manifold functions required of the mud. Thus, some clays while satisfactory from most standpoints are incapable of forming the required impervious sheath on the sides of the drill hole; others do not form a mud having the "body" required to carry away the cuttings; others tend to precipitate or flocculate under the influence of material escaping into the hole from penetrated formations; and others form suspensions that are insufficiently fluid.

As the result of our investigations, we have developed as a new article of manufacture particularly suitable for use in the formation of drilling muds, a dried pulverized clay of fine particle size containing a relatively large proportion of finely divided mineral phosphate. Generally speaking, the phosphate content may vary over a substantial range but preferably is equivalent to about 10% to about 15% $P_2O_5$ of the weight of the product. Several finely divided mineral phosphates may be employed, although it is preferable to employ mineral phosphates of a metal selected from the group consisting of calcium and aluminum. The mineral phosphates collophanite [$Ca_3(PO_4)_2H_2O$] and wavellite [$3Al_2O_3.2P_2O_5.13H_2O.HF$] are particularly suitable. These minerals, particularly wavellite, tend to be fibrous in character when finely divided, and the finely divided fibrous particles impart several desirable properties to a drilling mud prepared from the clay product of our invention.

We have discovered that the product of our invention may be dried to a moisture content of 15% or less by weight and still retain the properties required for use in a drilling mud and the like. Thus, we have discovered that the dried pulverized product of our invention (containing 5% to 15% moisture and preferably about 10% moisture) is easily dispersed in water to form a permanent suspension having all of the qualities required for a satisfactory drilling fluid.

Preferably at least 40% of the particles in the product of our invention are less than 5 microns in size. The finely divided phosphate mineral may be somewhat coarser, but the bulk of the phosphate minerals should be less than 30 microns in size. Thus, wavellite, if that is the phosphate mineral employed, should be principally less than 30 microns in size with a large proportion of it finer than 5 microns. Preferably at least 50% of the phosphate, calculated as $P_2O_5$, should be finer than 5 microns.

A suitable dried pulverized clay product prepared in accordance with our invention may comprise finely divided quartz, collophanite, wavellite, feldspar and clay, together with a small proportion of limonite with or without hematite. The clay should be principally —5 microns in size. Thus, a suitable pulverized dried clay product in accordance with our invention may comprise a material of the following analyses:

| Size | Screen analyses—weight per cent | | Chemical analyses—weight per cent | | | | | | Dist. per cent $P_2O_5$ |
|---|---|---|---|---|---|---|---|---|---|
| | Dir. | Cum. | $P_2O_5$ | $Fe_2O_3$ | $Al_2O_3$ | Insol. | CaO | $CO_2$ | |
| 48 mesh | 1.1 | 1.1 | 10.70 | .75 | 1.07 | 70.87 | 14.25 | .58 | 1.1 |
| 65 | 7.0 | 8.1 | 7.66 | .63 | .77 | 79.31 | 11.14 | .39 | 5.2 |
| 100 | 16.0 | 24.1 | 6.20 | .11 | .67 | 83.42 | 8.47 | .43 | 9.6 |
| 150 | 17.1 | 41.2 | 6.01 | .11 | .70 | 83.87 | 8.26 | .38 | 9.9 |
| 200 | 7.8 | 49.0 | 9.55 | .15 | 1.20 | 74.38 | 12.66 | .52 | 7.2 |
| 325 | 3.9 | 52.9 | 9.02 | .21 | .89 | 75.76 | 10.45 | .53 | 3.4 |
| 30 microns | 1.8 | 54.7 | 16.43 | .34 | 5.23 | 53.38 | 18.85 | .59 | 2.9 |
| 15 | 1.8 | 56.5 | 21.38 | .72 | 9.82 | 41.29 | 19.37 | .72 | 3.7 |
| 5 | 0.8 | 57.3 | 21.12 | 1.08 | 10.14 | 34.75 | 20.04 | .71 | 1.6 |
| —5 | 42.7 | 100.0 | 13.40 | 1.18 | 9.08 | 44.36 | 15.19 | .54 | 55.4 |
| Total | 100.0 | 100.0 | 11.19 | .64 | 4.65 | 63.70 | 12.43 | .49 | 100.0 |

It will be observed that in the above table the chemical analyses of the several sized fractions of the clay product are given. The −5 microns fraction, which comprises 42.7% by weight of the total, consists principally of clay with a substantial proportion of mineral phosphate—principally collophanite and wavellite. The fraction +5 microns −15 microns and the fraction +15 microns −30 microns are also principally clay, but contain a larger proportion of mineral phosphate as indicated by their high $P_2O_5$ content. The mineral phosphate in all fractions smaller than 30 microns is largely fibrous in character.

As shown by the table, the bulk of the phosphate is present as particles finer than 30 microns. Thus, 55.4% is minus 5 microns in size and 60.7% is minus 30 microns.

The product of our invention is produced conveniently from slimes derived in the washing of Florida pebble phosphate. As produced, these slimes contain only about 8% solids and are difficult to dewater. However, if these slimes are subjected to settlement for long periods in large settlement basins, say in the pits resulting from the phosphate mining operations, the slimes accumulate as deposits containing 60–70% solids. In accordance with our invention these deposits are mined by dry methods, say by power shovel or drag line (as distinguished from the hydraulic mining customarily employed in removing the original pebble phosphate deposits). The mined material containing 30–40% moisture is subjected to drying and disintegrating to produce the desired dried pulverized clay product. Thus, the mined material may be ground in a rod or ball mill through which a current of hot gas is passed. The mill is rotated at a velocity such that the material is carried into the upper portion of the mill and drops downward through the current of hot gas. Material that is sufficiently dry and fine is swept out of the mill by the current of gas and is collected in conventional dust collection apparatus such as a settling chamber or an electrostatic precipitator. The coarser material that passes through the current of gas remains in the mill until it has been ground and dried sufficiently. The mill thus serves the three-fold function of grinding, drying and classifying.

As indicated above, we prefer to produce the product of our invention from slimes that have been subjected to settlement for long periods. However, if desired, the slimes may be treated immediately after production. Thus, current slimes from a hydroseparator employed in the washing of Florida pebble phosphate may be subjected to a settling operation as soon as they are produced. The wet mud from the settling operation may then be treated in substantially the same manner as the slimes mined from the pits.

The dried pulverized material, containing 15% or less of moisture and preferably about 10% moisture, is removed from the dust collector, bagged or otherwise packaged and shipped to the point of consumption. If desired, addition agents may be included in the dried product. Thus, in some instances, it may be desirable to incorporate in the dried material or in a drilling mud made therefrom addition agents such as hay, straw, cement, or other known addition agents, including water-soluble and water-insoluble organic and inorganic compounds.

We claim:

1. In rotary drilling of a well, the improvement which comprises circulating from top to bottom of the well a drilling mud comprising an aqueous suspension of a finely divided clay containing a relatively large proportion of a finely divided substantially water-insoluble mineral phosphate.

2. In rotary drilling of a well, the improvement which comprises circulating from top to bottom of the well a drilling mud comprising an aqueous suspension of a finely divided clay containing a relatively large proportion of a finely divided fibrous substantially water-insoluble mineral phosphate.

3. In rotary drilling of a well, the improvement which comprises circulating from top to bottom of the well a drilling mud comprising an aqueous suspension of a finely divided clay containing a relatively large proportion of a finely divided fibrous substantially water-insoluble mineral phosphate, at least 40% of the solid particles in the suspension being less than 5 microns in size.

4. In rotary drilling of a well, the improvement which comprises circulating from top to bottom of the well, a drilling mud comprising an aqueous suspension of a finely divided clay containing a relatively large proportion of a finely divided substantially water-insoluble mineral phosphate selected from the group consisting of wavellite and collophanite.

5. In rotary drilling of a well, the improvement which comprises circulating from top to bottom of the well a drilling fluid comprising an aqueous suspension of a finely divided clay containing about 10 to about 15% by weight of a finely divided substantially water-insoluble mineral phosphate, at least 40% of the particles in the circulated suspension being less than 5 microns in size.

6. A drilling mud comprising a aqueous suspension of clay of fine particle size containing a relatively large proportion of finely divided, substantially water-insoluble mineral phosphate.

7. A drilling mud comprising a aqueous suspension of clay of fine particle size containing a relatively large proportion of finely divided, substantially water-insoluble mineral phosphate of a metal selected from the group consisting of calcium and aluminum.

8. A drilling mud comprising a aqueous suspension of clay of fine particle size containing finely divided, substantially water-insoluble mineral phosphate in proportions equivalent to about 10% to about 15% $P_2O_5$ by weight.

9. A drilling mud comprising a aqueous suspension of clay of fine particle size containing a relatively large proportion of finely divided, substantially water-insoluble mineral phosphate of a metal selected from the group consisting of calcium and aluminum, at least 40% of the particles of the clay being less than 5 microns in size.

10. A drilling mud comprising a aqueous suspension of clay of fine particle size containing a relatively large proportion of a finely divided mineral phosphate selected from the group consisting of wavellite and collophanite.

11. A drilling mud comprising a suspension of clay at least 40% by weight of which comprises particles having a size of less than 5 microns and containing a relatively large proportion of a finely divided, substantially water-insoluble fibrous mineral phosphate having a particle size of less than 30 microns.

HUGH S. TEN EYCK.
CHESTER A. FULTON.